United States Patent [19]

Kusunoki et al.

[11] Patent Number: 4,845,576
[45] Date of Patent: Jul. 4, 1989

[54] MAGNETIC RECORDING/REPRODUCTION APPARATUS

[75] Inventors: Masahiro Kusunoki, Tachikawa; Toshiya Saito; Hiroshi Okamura, both of Oome; Hiroshi Ohashi, Higashiyamato, all of Japan

[73] Assignees: Kabushiki Kaisha Toshiba, Kawasaki; Toshiba Computer Engineering Corporation, Tokyo, both of Japan

[21] Appl. No.: 145,701

[22] Filed: Jan. 15, 1988

Related U.S. Application Data

[63] Continuation of Ser. No. 856,179, Apr. 28, 1986, abandoned.

[30] Foreign Application Priority Data

Apr. 30, 1985 [JP] Japan .................... 60-92560

[51] Int. Cl.⁴ ............................ G11B 5/02; G11B 5/09
[52] U.S. Cl. ........................................ 360/67; 360/46
[58] Field of Search .................... 360/67, 46

[56] References Cited

U.S. PATENT DOCUMENTS 3,588,380  6/1971  Horlander et al. ................ 360/66
4,297,730 10/1981  Kadowaki et al. ................ 360/66

FOREIGN PATENT DOCUMENTS 110365  6/1984  European Pat. Off. .
2006509  5/1979  United Kingdom .

OTHER PUBLICATIONS

"The Effect of the Angular Dependence of the Particle Nucleation Field on the Magnetic Recording Process'-'-by H. N. Bertram, IEEE Transactions on Magnetics, vol. May 20, #6, Nov. 1984.
"Combined Longitudinal & Vertical Magnetic Recording Head", by A. Hongland, IBM TDB, vol. 20, #8, 1/78.
"Phase Equalization for Perpendicular Recording", by B. Langland, IEEE Transactions on Magnetics, Mag. 18, #6, 11/82.
Grundig Technische Informationen, vol. 31, #3, 1984.
Japanese Patent Application No. 58-119336; Waveform Equalizer; H. Suzuki et al., (Toshiba).
Japanese Patent Disclosure (Kokai) No. 60-10456 published on Jan. 19, 1985.

Primary Examiner—Vincent P. Canney
Attorney, Agent, or Firm—Finnegan, Henderson, Farabow, Garrett and Dunner

[57] ABSTRACT

A magnetic recording/reproduction apparatus of the invention has a magnetic head for reading a vertical magnetically recorded signal, an inplane magnetic recorded signal or a magnetic recorded signal having both a vertical magnetic component and an inplane magnetic component and for supplying a reproduced signal, a first analog signal converting circuit for converting the reproduced signal into an analog inplane reproduced signal when the reproduced signal is a vertical reproduced analog signal, a second analog signal converting circuit for bypassing an inplane analog reproduced signal when the reproduced signal is the inplane reproduced analog signal, and a third analog signal converting circuit for converting the reproduced signal into an inplane reproduced analog signal when the reproduced signal is the inplane reproduced analog signal. The circuits are switched to operate selectively in accordance with the type of signals reproduced from a magnetic recording medium.

13 Claims, 5 Drawing Sheets

RESIDUAL MAGNETIZATION

REPRODUCED OUTPUT E7

RESIDUAL MAGNETIZATION

REPRODUCED OUTPUT E8

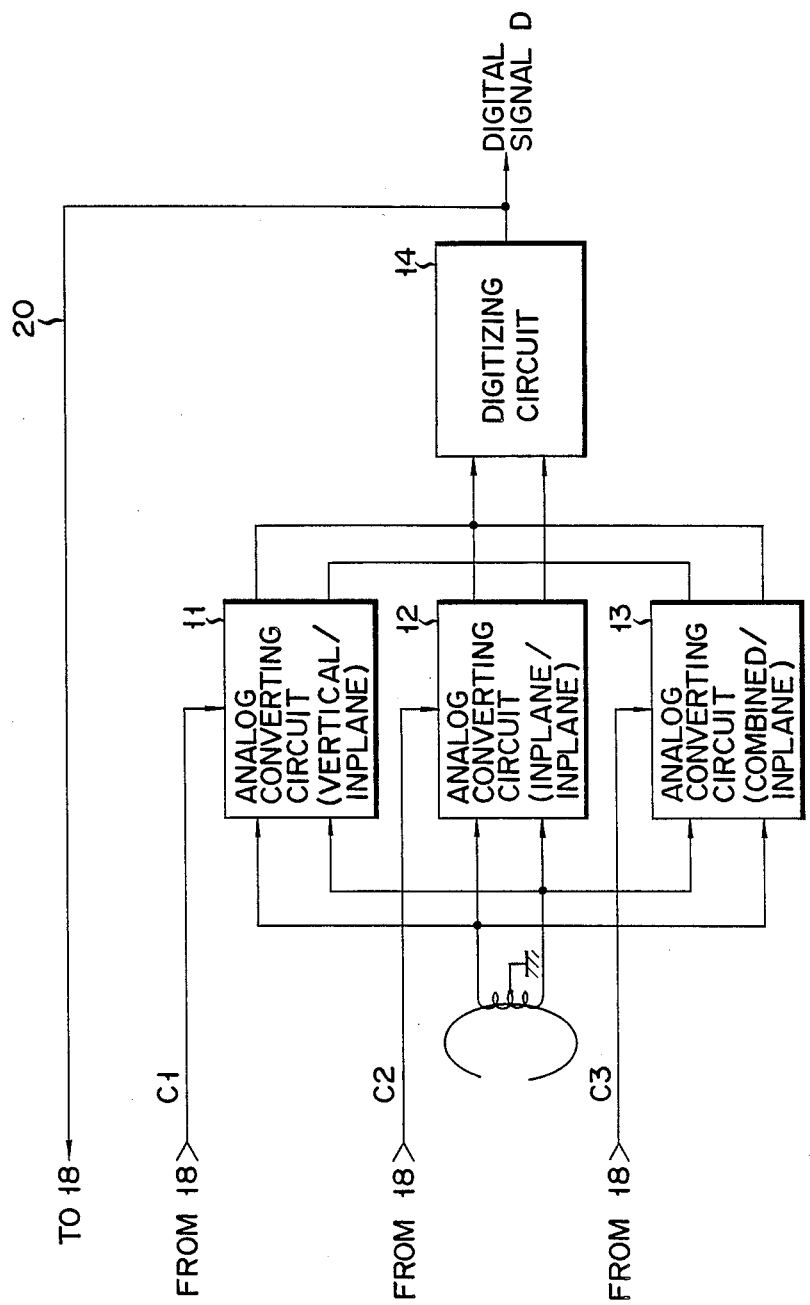

MAGNETIC RECORDING/REPRODUCTION APPARATUS

This application is a continuation of application Ser. No. 856,179, filed Apr. 28, 1986 now abandoned.

BACKGROUND OF THE INVENTION

The present invention relates to a magnetic recording/reproduction apparatus for reproducing signals recorded on a high-density magnetic recording medium.

Some recent magnetic recording apparatuses use a vertical magnetic recording scheme which is particularly effective for high-density recording. Signals reproduced from a magnetic recording medium using the vertical magnetic recording scheme are 90 degrees out of phase with respect to those reproduced from a medium using a conventional inplane (longitudinal) magnetic recording scheme.

Referring to FIG. 1A, when 1-bit data (magnetic inversion) is recorded as a sine wave on a recording medium by the vertical magnetic recording scheme, a reproduced output signal obtained by residual magnetization is represented in FIG. 1B as E1. When, on the other hand, 1-bit data is recorded as a sine wave by the inplane magnetic recording system, its reproduced signal, E2 in FIG. 1C, is found, as shown in FIG. 1D, to be 90 degrees out of phase with signal E1.

As shown in FIG. 2A, when 1-bit data is recorded as a complete rectangular wave by the vertical magnetic recording scheme, reproduced output signal E3, shown in FIG. 2B, is obtained. When 1-bit data is recorded by the inplane magnetic recording scheme, as shown in FIG. 2C, reproduced output signal E4, shown in FIG. 2D, is obtained.

When 1-bit data is recorded as a rectangular wave by the vertical magnetic recording scheme and the recording medium is demagnetized, as shown in FIG. 3A, reproduced output signal E5, shown in FIG. 3B is obtained.

When 1-bit data is recorded as a rectangular wave by the in-plane magnetic recording scheme, and the recording medium is demagnetized as shown in FIG. 3C, reproduced output signal E6 shown in FIG. 3D, is obtained.

A magnetic recording/reproduction apparatus using the vertical magnetic recording must be able to reproduce information from a recording medium using the in-plane magnetic recording if highly efficient information processing is to be achieved.

Since reproduced output signals corresponding to the two schemes are 90 degrees out of phase, a conventional magnetic recording/reproduction apparatus using the vertical magnetic recording cannot reproduce information recorded by the in-plane magnetic recording. The residual magnetization transition point in a 1-bit data recording medium corresponds to the zero-cross point of the output signal reproduced in the vertical magnetic recording scheme and to the peak point of the output signal reproduced in the in-plane magnetic recording scheme.

A combination of the vertical magnetic recording scheme and the in-plane magnetic recording scheme is known. In this combination scheme, recording medium residual magnetization consists of vertical and in-plane componenets. With a recording medium having a residual magnetization in which the in-plane component is larger than the vertical component shown in FIG. 4A, an output wave shown in FIG. 4B is obtained. With a recording medium having a residual magnetization in which the vertical component is larger than the in-plane component shown in FIG. 4C, an output waveform shown in FIG. 4D is obtained. A magnetic recording/reproduction apparatus using the vertical magnetic recording scheme cannot reproduce such data.

SUMMARY OF THE INVENTION

It is an object of the present invention to provide a magnetic recording/reproduction apparatus which can reliably reproduce data from media in which signals are recorded by the vertical magnetic recording scheme, the in-plane magnetic recording scheme, or a combination of the two schemes.

In order to achieve the above object of the present invention, there is provided a magnetic recording/reproduction apparatus comprising:

a magnetic head for reading a magnetically recorded signal from a magnetic recording medium in which one of a vertical magnetic recorded signal, an in-plane magnetic recorded signal, and a magnetic recorded signal having a vertical magnetic recorded component and an in-plane magnetic recorded component is recorded;

a first analog signal converting circuit for converting a reproduced analog signal from the magnetic head into an in-plane magnetically reproduced analog signal or bypassing the reproduced analog signal when the reproduced analog signal is a vertical reproduced analog signal;

a second analog signal converting circuit for bypassing an analog signal reproduced from the magnetic head or converting the reproduced analog signal into a vertical reproduced analog signal when the reproduced analog signal is an in-plane reproduced analog signal;

a third analog signal converting circuit for converting an analog signal reproduced from the magnetic head into an in-plane reproduced analog signal or a vertical reproduced analog signal when the reproduced analog signal is a reproduced composite analog signal; and analog signal converting circuit switching means for enabling only the first analog signal converting circuit when the reproduced analog signal read from the magnetic recording medium is detected to be the vertical reproduced analog signal, for enabling only the second analog signal converting circuit when the reproduced analog signal is detected to be the in-plane reproduced analog signal, and for enabling only the third analog signal converting circuit when the reproduced analog signal is detected to be the reproduced composite analog signal.

BRIEF DESCRIPTION OF THE DRAWINGS

Other objects and features of the present invention will be apparent from the following description, given in connection with the accompanying drawings, in which:

FIGS. 1A through 4D are diagrams explaining conventional magnetic recording schemes, in which FIG. 1A shows residual magnetization occurring when 1-bit data (represented by magnetic inversion) is recorded as a sine wave in a recording medium by the vertical magnetic recording scheme. FIG. 4D shows reproduced output signal E8 corresponding to the residual magnetization in FIG. 4C;

FIGS. 5A and 5B are block diagrams showing an embodiment of a magnetic recording/reproduction apparatus and its peripheral equipment according to the present invention;

DETAILED DESCRIPTION OF THE PREFERRED EMBODIMENTS

Figure 5A:
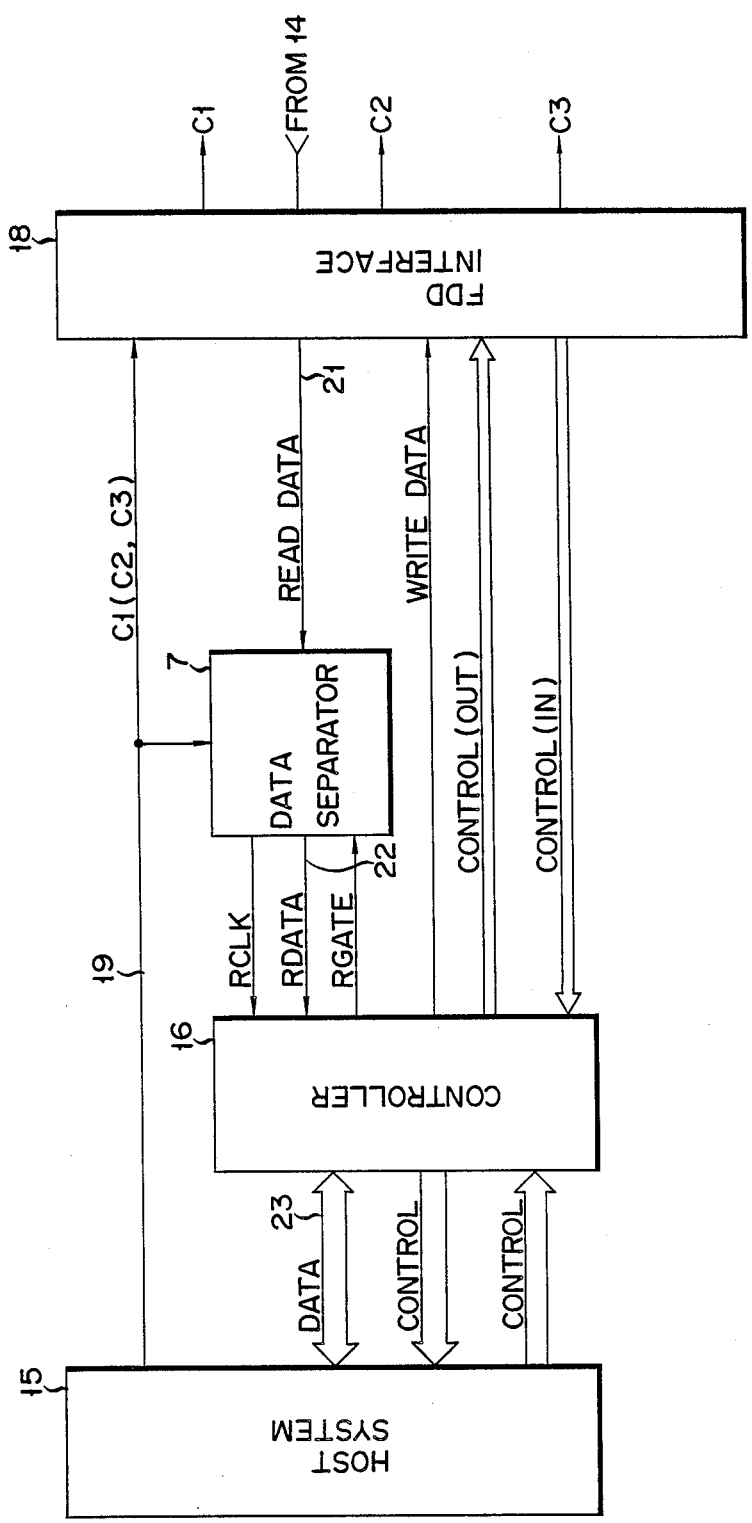

FIGS. 5A and 5B are block diagrams showing a magnetic recording/reproduction apparatus and its peripheral equipment according to the present invention.

FIG. 5A shows host system 15, controller 16 connected to host system 15, data separator 17 connected to controller 16, and floppy disk drive (FDD) interface 18 connected to host system 15, controller 16 and data separator 17. Controller 16 is, e.g., a floppy disk controller or a hard disk controller. The floppy disk controller can be Model $\mu$PD 7260 available from NEC CORP., Japan. The hard disk controller can be Model HDC 9244 available from SMC Corp., U.S.A. Host system 15 supplies switching signals C1 to C3 (to be described later) to analog converting circuits 11, 12 and 13 (to be described later), respectively, through line 19 and FDD interface 18. An output signal from digitizing circuit 14 in FIG. 5B is fed back to interface 18 through line 20. An output signal from interface 18 is fed back to host system 15 through line 21, data separator 17, line 22, controller 16, and data bus 23.

Controller 16 implements serial-parallel conversion of data between the floppy disk unit and the host system, encoding/decoding, head access and so on.

Data is recorded on the floppy disk in the form of FM or MFM code. FM code is used for single density recording, and MFM code is used for double density recording. These codes are formed by combining clock signals and data, and allow for the recording and reproducing of data, in spite of the deviation of the rotation of the disk.

When data is recorded, NRZ-coded data and clock signal are combined to produce FM/MFM code data. On the other hand, when data is reproduced, NRZ-coded data and clock signal are separately extracted from the FM/MFM data. Data separator 17 divides the FM/MFM data into the data and the clock signal.

The host system 15 transfers commands and data to controller 16. Controller 16 implements, in accordance with the commands, data transfer, seeking of a target track, formatting of sectors, and so on.

Controller 16 interrupts host system 15 to inform that the execution of the commands has been completed. And then, host system 15 reads the status word from controller 16 to recognize the execution results.

Figure 1A:
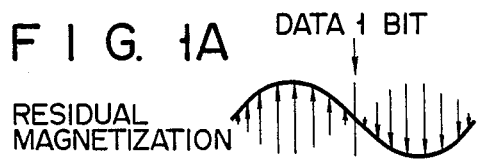
Figure 1B:
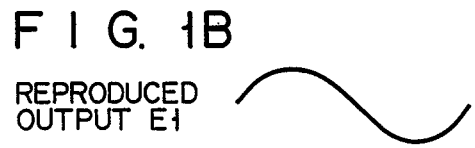
FIG. 1B shows reproduced output signal E1 corresponding to residual magnetization in FIG. 1A.
Figure 1C:
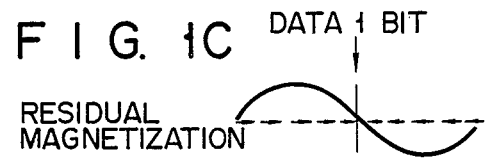
FIG. 1C shows residual magnetization occurring when 1-bit data (magnetic inversion) is recorded in a sine wave in a recording medium by the in-plane magnetic recording scheme.
Figure 1D:
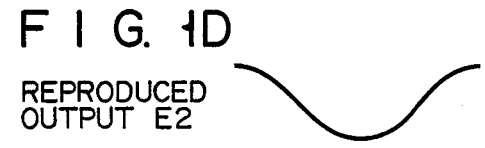
FIG. 1D shows reproduced output signal E2 corresponding to residual magnetization in FIG. 1C.
Figure 2A:
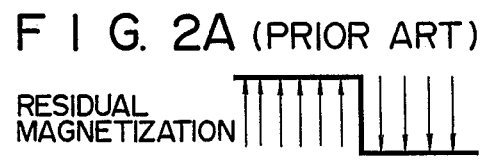
FIG. 2A shows residual magnetization when 1-bit data is recorded as a complete rectangular wave by the vertical magnetic recording.
Figure 2B:
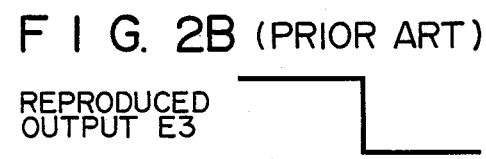
FIG. 2B shows reproduced output signal E3 corresponding to the residual magnetization in FIG. 2A.
Figure 2C:
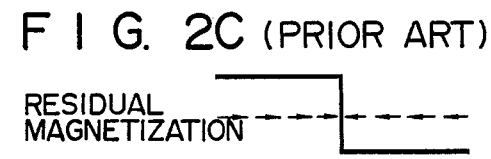
FIG. 2C shows residual magnetization when 1-bit data is recorded by the in-plane magnetic recording.
Figure 2D:
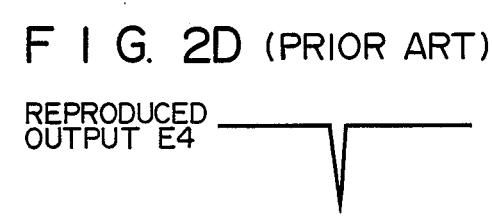
FIG. 2D shows reproduced output signal E4 corresponding to the residual magnetization in FIG. 2C.
Figure 3A:
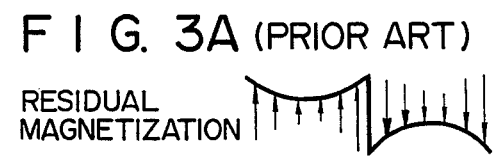
FIG. 3A shows residual magnetization occurring when 1-bit data (a rectangular wave) is recorded by the vertical magnetic recording scheme to cope with the demagnetization of the medium.
Figure 3B:
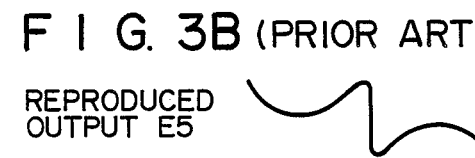
FIG. 3B shows reproduced output signal E5 corresponding to the residual magnetization in FIG. 3A.
Figure 3C:
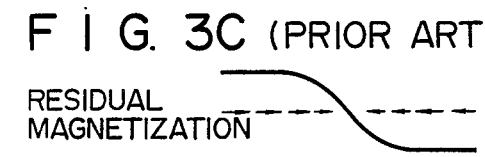
FIG. 3C shows residual magnetization occurring when 1-bit data is recorded in a rectangular wave by the in-plane magnetic recording scheme to cope with the demagnetization of the medium.
Figure 3D:
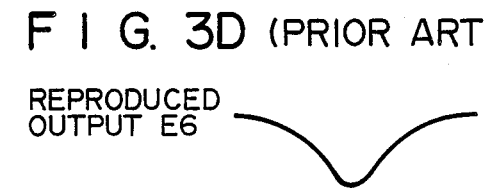
FIG. 3D shows reproduced output signal E6 corresponding to the residual magnetization in FIG. 3C.
Figure 4A:
FIG. 4A shows residual magnetization in which an in-plane component is larger than a vertical component.
Figure 4B:
FIG. 4B shows reproduced output signal E7 corresponding to the residual magnetization in FIG. 4A.
Figure 4C:
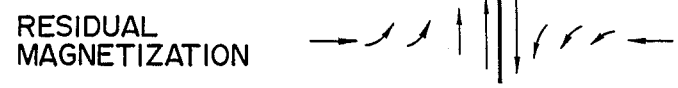
FIG. 4C shows residual magnetization in which a vertical component is larger than an in-plane component.
Figure 4D:

FIG. 5B is a block diagram showing the configuration of the magnetic recording/reproduction apparatus and its peripheral equipment according to the present invention. The apparatus has ring-type magnetic head 10, analog converting circuits 11 through 13, and digitizing circuit 14. Head 10 has a coil with a center tap. Circuits 11 through 13 are operated by switching control signals C1 to C3 supplied from host system 15 through controller 16, and transform the analog reproduced signal waves from head 10 into analog signals (see FIG. 1D) corresponding to the in-plane magnetic recorded signal. When an analog reproduced signal corresponding to a vertical magnetic recorded signal (hereinafter called "vertical reproduced signal") is output from head 10, circuit 11 transforms it into analog reproduced signal E1. When head 10 outputs an analog reproduced signal corresponding to an in-plane magnetic recorded signal (hereinafter called "in-plane reproduced signal"), circuit 12 directly outputs it. When head 10 outputs an analog reproduced signal corresponding to an intermediate or combined magnetic recorded signal (hereinafter called "composite reproduced signal"), circuit 13 transforms it into analog reproduced signal E7 or E8. The composite reproduced signal is a magnetically recorded signal in which a vertical component and an in-plane component are mixed at a predetermined ratio. Circuit 14 differentiates an analog reproduced signal supplied from one of circuits 11 through 13 and detects the zero-cross point of this signal. Circuit 14 can be Mitsubishi Model MC3470 or Hitachi Model HA16631.

Figure 7:
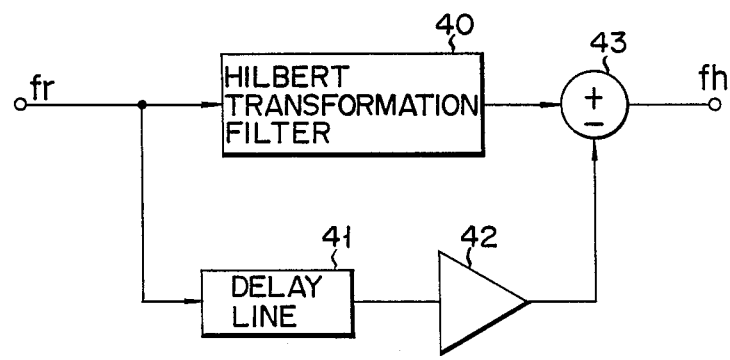
FIG. 7 is a block diagram showing the configuration of an analog converting circuit in the embodiment shown in FIG. 5B.

Circuits 11 through 13 can comprise a wave equalizer as shown in FIG. 7. Such circuit is disclosed, e.g., in Japanese Patent Application No. 58-119336. The equalizer has Hilbert transformation filter 40, delay line 41, amplifier 42, and adder/subtracter 43.

In-plane wave f(t) and vertical wave g(t) have a relationship of a Hilbert transformation defined by:

$$g(t) = \int_{-\infty}^{+\infty} f(\tau) \cdot \{1/(t - \tau)\} d\tau \tag{1}$$

When this is transformed onto the frequency axis, we have:

$$G(f) = e^{-j(\pi/2)sgn(t)} \cdot F(f) \tag{2}$$

for $$G(f) = \int_{-\infty}^{+\infty} g(t) \cdot e^{j2\pi ft} dt$$

$$F(f) = \int_{-\infty}^{+\infty} f(t) \cdot e^{j2\pi ft} dt$$

$$sgn(t) = -1 \text{ for } f < 0$$
$$= +1 \text{ for } f \geq 0$$

When the in-plane and vertical components of reproduced signal (composite) wave fR supplied to the input terminal of the equalizer shown in FIG. 7 are represented by $\alpha H$ and $\alpha V$, respectively, fR is expressed in a complex plane as:

$$fR = \sqrt{\alpha H^2 + \alpha V^2} \cdot e^{j\theta} \tag{3}$$

$$\theta = \tan^{-1} \alpha H / \alpha V$$

Reproduced signal fR is transformed by filter 40 into:

$$H[fR] = \sqrt{\alpha H^2 + \alpha V^2} \cdot e^{j(\theta - \pi/2)} \tag{4}$$

Reproduced signal wave fR is also delayed by line 41, amplified at a gain of $\alpha H/\alpha V$ by amplifier 42, and added to the Hilbert transform wave from filter 40 by adder/subtracter 43. The output signal from adder/subtracter 43 is:

$$(\alpha H/\alpha V)fR + H[fR]$$

$$= \sqrt{\alpha H^2 + \alpha V^2} \cdot \{(\alpha H/\alpha V)e^{j(\theta - \pi/2)}\} \tag{5}$$

$$= \alpha V\{1 + (\alpha H/\alpha V)^2\} \tag{6}$$

and includes only an in-plane component.

When only a vertical component is extracted from the composite signal, the gain of amplifier 42 is set at $\alpha V/\alpha H$, and the output signal from adder/subtracter 43 then includes only the vertical component.

The operation of the embodiment will be described. Assume that head 10 reproduces data from a magnetic recording medium in which information is recorded by the combined magnetic recording scheme, and therefore head 10 produces a composite signal. Host system 15 supplies switching signals C1 through C3 to circuits 11 through 13 via controller 16. More specifically, host system 15 first supplies signal C1 to circuit 11. Circuit 11 transforms the signal reproduced by head 10 into an in-plane reproduced signal and supplies it to circuit 14. Circuit 14 differentiates the signal, detects the zero-cross point of the signal, and outputs digital signal D corresponding to the zero-cross point. Digital signal D is fed back to host system 15 through controller 16. Since the signal supplied to circuit 11 is a composite signal, host system 15 can determine that digital circuit D is an error signal. As a result, host system 15 supplies switching signal C2 to circuit 12 through controller 16. The reproduced signal from circuit 12 is digitized by circuit 14 and digital signal D therefrom is fed back to host system 15. In this case, since the reproduced signal supplied to circuit 12 is a composite signal, host system 15 determines that digital signal D is an error signal. As a result, host system 15 supplies switching signal C3 to circuit 13. Then, circuit 13 is enabled. Circuit 13 transforms the composite signal reproduced by head 10 into an in-plane reproduced signal in the manner described above and supplies it to circuit 14. Circuit 14 differentiates the signal, detects the zero-cross point of the signal, and supplies normal digital signal D corresponding to the zero-cross point.

Assume that head 10 reproduces data from a magnetic recording medium in which information is recorded by the vertical magnetic recording scheme. Host system 15 first supplies switching signal C1 to circuit 11 through controller 16. Only circuit 11 is then enabled. Circuit 11 transforms the vertical reproduced signal supplied from head 10 into an in-plane reproduced signal, using the wave equalizer shown in FIG. 7.

The in-plane signal output by circuit 11 is supplied to circuit 14. Circuit 14 differentiates the signal, detects the zero-cross point of the signal, and oututs digital signal D corresponding to the zero-cross point.

When head 10 reproduces data from a magnetic recording medium in which information is recorded by the in-plane magnetic recording scheme, host system 15 supplies switching signal C2 to circuit 12 through controller 16. Circuit 12 bypasses the in-plane reproduced signal supplied from head 10 to circuit 14.

In this manner, for any magnetic recording medium using the vertical magnetic recording scheme, the in-plane magnetic recording scheme and the combined magnetic recording scheme, a signal reproduced by head 10 can be transformed into a normal in-plane reproduced signal of a predetermined format. Therefore, since a normal in-plane reproduced analog signal can be obtained from any of magnetic recording media of different recording schemes, digitizing circuit 14 for reproducing in-plane reproduced signals can reproduce digital recorded signals.

Figure 6:
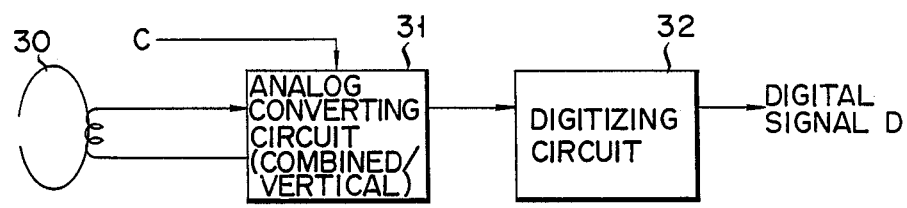
FIG. 6 is a block diagram of a main part of a second embodiment of a magnetic recording/reproduction apparatus according to the present invention.

The present invention is not limited to the above embodiment. For example, in the first embodiment, an analog signal reproduced by head 10 is transformed into an in-plane reproduced signal. However, an analog signal reproduced by head 10 can be transformed into a vertical reproduced signal. In this case, as shown in FIG. 6, analog converting circuit 31 performing an operation for transforming an output signal supplied from head 10 into a vertical reproduced signal is used as an analog converting circuit.

When a composite reproduced signal is transformed into a vertical reproduced signal by the wave equalizer in FIG. 7, circuit 31 sets the gain of amplifier 42 at $\alpha V/\alpha H$. Adder/subtracter 43 performs subtraction in this case. Digitizing circuit 32 detects the zerocross point of the vertical analog signal supplied from circuit 31 and outputs digital signal D corresponding to the zero-cross point.

When such circuit 31 for transforming an input signal into a vertical reproduced signal is used, a vertical reproduced signal can always be obtained from a magnetic recording medium by any of the vertical magnetic recording scheme, the in-plane magnetic recording scheme and the combined magnetic recording scheme. Thus, in any of such schemes, digitizing circuit 32 for the vertical reproduced signal outputs a normal digital signal according to the recorded information.

In the above embodiments, host system 15 generates switching signals C1 through C3 in turn.

However, since a magnetic recording medium having holes coding an analog vertical reproduced signal, an analog in-plane reproduced signal and an analog combined reproduced signal can be used, controller 16 detects the holes and accordingly supplies switching signals C1 through C3.

What is claimed is:

1. An apparatus for magnetically recording and reproducing digital data in and from magnetic recording media of various types having different magnetization directions with respect to a recording surface thereof, comprising:
   a magnetic head for detecting magnetic signals representing the digital data from a magnetic recording medium and outputting a wave signal in response to the magnetic signal;
   the magnetic head outputting a first wave signal having a first waveform when the magnetic head reads the magnetic signals from a first magnetic recording medium using a magnetic substance having a first magnetization direction with respect to a recording surface thereof, and also outputting a second wave signal when the same magnetic head reads the magnetic signal from a second magnetic recording medium using another magnetic substance having a second magnetization direction with respect to a recording surface thereof;
   waveform converting means for converting the waveform type of the second wave signal output from the magnetic head into a waveform type substantially identical to the waveform type of the first wave signal when the magnetic head outputs the second wave signal; and
   digitizing means for reproducing the digital data in response to either one of the first wave signal or the second wave signal, the waveform type of which has been converted by the waveform converting means.

2. An apparatus according to claim 1, further comprising detecting means for detecting whether the magnetic head reads the magnetic signals from the first medium or from the second medium, and wherein the waveform converting means is connected to the magnetic head, and converts the waveform of a reproduced wave signal from the magnetic head when the detecting means detects that the magnetic head reads the magnetic signals from the second magnetic medium.

3. An apparatus according to claim 2, wherein the detecting means performs the detection by detecting whether or not the digitizing means correctly reproduces the digital data in response to a wave signal from the waveform converting means.

4. An apparatus according to claim 3, wherein the detecting means first controls the waveform converting means to directly output the wave signal from the magnetic head to the digitizing means, and detects that the magnetic head reads the magnetic signals from the second medium if the digitizing means does not correctly reproduce the digital signal in response to the wave signal from the waveform converting means.

5. An apparatus according to claim 3, wherein the detecting means first controls the waveform converting means to convert the wave signal from the magnetic head to the digitizing means, and detects that the magnetic head reads the magnetic signals from the first medium if the digitizing means does not correctly reproduce the digital signal in response to the converted wave signal from the waveform converting means.

6. An apparatus according to claim 1, wherein magnetic signals recorded in said magnetic recording medium using the magnetic substance having said first magnetization direction is comprised of in-plane magnetic recorded components, and magnetic signals recorded in said magnetic medium using the magnetic substance having said second magnetization direction is comprised of vertical magnetic recorded components.

7. An apparatus according to claim 1, wherein magnetic signals recorded in said magnetic recording medium using the magnetic substance having said first magnetization direction is comprised of vertical magnetic recorded components, and magnetic signals recorded in said magnetic recording medium using the magnetic substance having said second magnetization direction is comprised of in-plane magnetic recorded components.

8. A magnetic recording/reproduction apparatus comprising:
   a magnetic head for reading a magnetic recorded signal from a magnetic recording medium in which one of a vertical magnetic recorded signal, an in-plane magnetic recorded signal, and a magnetic recorded signal having both a vertical magnetic recorded component and an in-plane magnetic recorded component is recorded;
   a first analog signal converting circuit for converting an analog signal reproduced by said magnetic head into an in-plane magnetic reproduced analog signal at times when the reproduced analog signal is a vertical reproduced analog signal;
   a second analog signal converting circuit for bypassing an analog signal reproduced by said magnetic head at times when the reproduced analog signal is an in-plane reproduced analog signal;
   a third analog signal converting circuit for converting an analog signal reproduced by said magnetic head into an in-plane reproduced analog signal at times when the reproduced analog signal is a reproduced composite analog signal; and
   analog signal converting circuit switching means for enabling, in the alternative, said first analog signal converting circuit at times when the reproduced analog signal read from said magnetic recording medium is detected to be the vertical reproduced analog signal, said second analog signal converting circuit at times when the reproduced analog signal is detected to be the in-plane reproduced analog signal, and said third analog signal converting circuit at times when the reproduced analog signal is detected to be the reproduced composite analog signal.

9. An apparatus according to claim 8, wherein said magnetic recording medium has holes representing the analog vertical reproduced signal, the analog in-plane reproduced signal, and the analog component reproduced signal, and said analog signal converting circuit switching mean detects the holes to determine the type of the analog signal reproduced by said magnetic head.

10. An apparatus according to claim 8, wherein said analog signal converting circuit switching means includes means operative to receive a signal representing the type of the analog signal reproduced by said magnetic head from a host system.

11. A magnetic recording/reproduction apparatus comprising:
   a magnetic head for reading a magnetic recorded signal from a magnetic recording medium in which one of a vertical magnetic recorded signal, an in-plane magnetic recorded signal, and a magnetic recorded signal having both a vertical magnetic recorded component and an in-plane magnetic recorded component is recorded;

a first analog signal converting circuit for bypassing an analog signal reproduced by said magnetic head at times when the reproduced analog signal is a vertical reproduced analog signal;

a second analog signal converting circuit for converting an analog signal reproduced by said magnetic head into a vertical reproduced analog signal at times when the reproduced analog signal in an in-plane reproduced analog signal;

a third analog signal converting circuit for converting an analog signal reproduced by said magnetic head into a vertical reproduced analog signal at times when the reproduced analog signal is a reproduced composite analog signal; and analog signal converting circuit switching means for enabling, in the alternative, said first analog signal converting circuit at times when the reproduced analog signal read from said magnetic recording medium is detected to be the vertical reproduced analog signal, said second analog signal converting circuit at times when the reproduced analog signal is detected to be the in-plane reproduced analog signal, and said third analog signal converting circuit at times when the reproduced analog signal is detected to be the reproduced composite analog signal.

12. An apparatus according to claim 11, wherein said magnetic recording medium has holes representing the analog vertical reproduced signal, the analog in-plane reproduced signal, and the analog composite reproduced signal, and said analog signal converting circuit switching means detects the holes to determine the type of the analog signal reproduced by said magnetic head.

13. An apparatus according to claim 11, wherein said analog signal converting circuit switching means includes means operative to receive a signal representing the type of the analog signal reproduced by said magnetic head from a host system.

* * * * *